Dec. 25, 1956  H. RODANET  2,775,406
ODOMETER
Filed Oct. 24, 1952
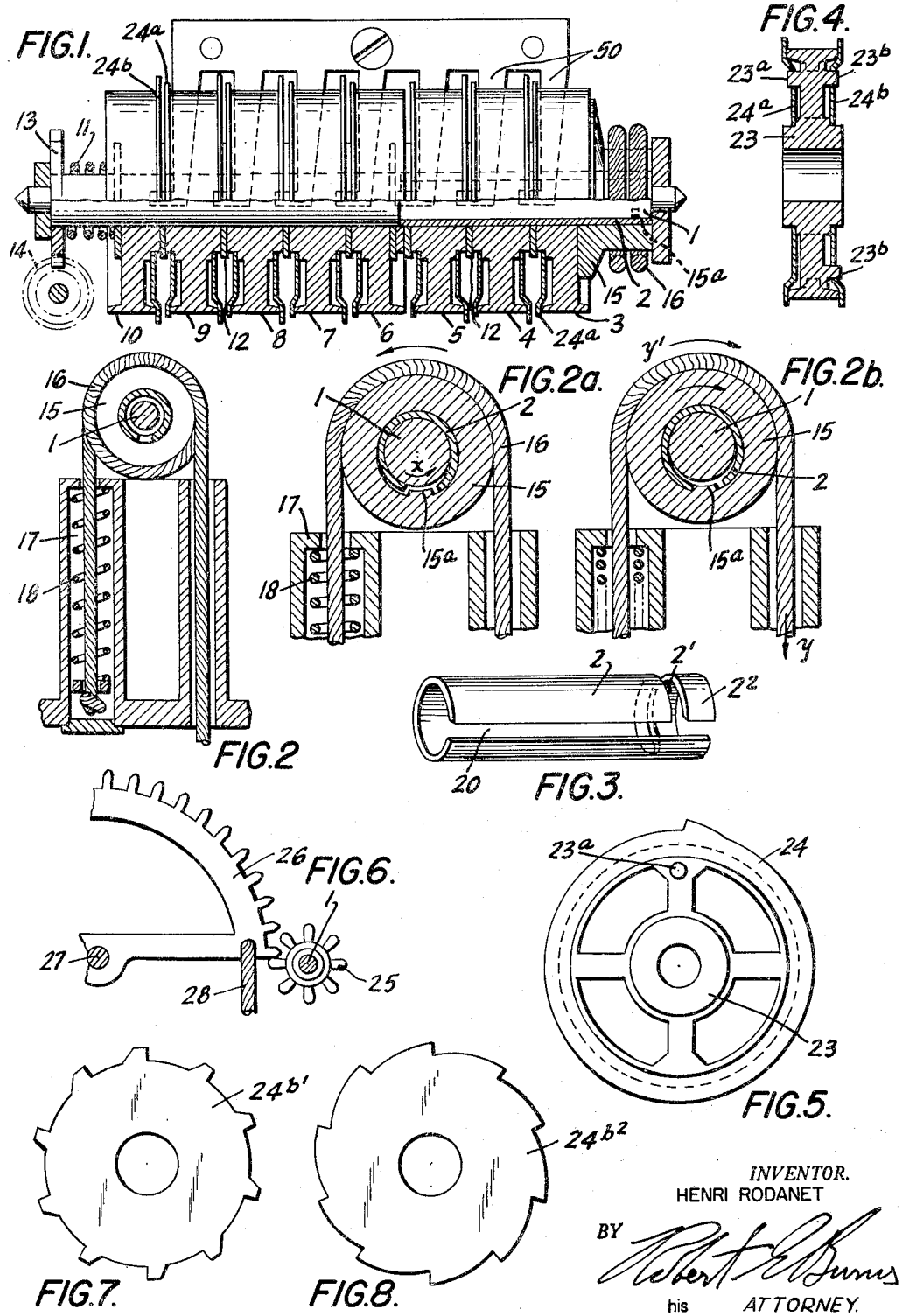
INVENTOR.
HENRI RODANET
BY
his ATTORNEY.

United States Patent Office

2,775,406
Patented Dec. 25, 1956

2,775,406

ODOMETER

Henri Rodanet, Neuilly-sur-Seine, France

Application October 24, 1952, Serial No. 316,620

Claims priority, application France March 3, 1952

6 Claims. (Cl. 235—97)

The present invention relates to improvements in odometers comprising a general totalizer and a trip totalizer, more particularly utilized for vehicles, said improvements permitting the efficiency to be increased and the cost thereof to be reduced while facilitating the provision of the dial of the indicating instrument on the instrument panel of the vehicle.

In accordance with an important feature of the invention, the general totalizer and the trip totalizer, which have hitherto been mounted on two separate shafts and driven by separate members, are driven by common members and mounted either in alignment with one another on a single shaft provided with a sliding friction sleeve on which the drums of the trip totalizer are mounted, or on two shafts which are or are not in alignment with one another and are connected together by a friction sliding coupling. These devices enable the trip totalizer to be zeroized by rotation in the direction opposite to the normal direction of operation, the sleeve or the sliding coupling setting up a resistance to rotation which is greater than the resistance produced by the friction of the assembly of drums of the trip indicator during the normal operation of the odometer.

According to another feature of the invention, the trip totalizer is mounted either on a sliding sleeve frictionally connected with its driving shaft, or on a shaft connected by friction with the driving member when the general totalizer and the trip totalizer are not in alignment with one another. The zeroizing of the trip totalizer may be obtained by rotating the sleeve or the drum carrying shaft in a direction opposite to the driving motion by the means usually utilized in totalizers or by the pulley-and-cable system to be described later.

In one embodiment of the invention, the totalizers, which consist in known manner of drums driven by friction and comprise locking and unlocking members, as described, for example, in my Patent No. 1,695,663 of December 18, 1928, permitting driving only at predetermined instants, are disposed in alignment on a common shaft, the drums of the trip totalizer being mounted on a sleeve surrounding the shaft, so that they may be driven in the opposite direction to the normal drive by rotation of the sleeve, the drums of the general totalizer which are mounted directly on the shaft not being affected by this movement.

The usual disengaging means provided in the odometers of known types are thus rendered unnecessary and the trip totalizer can be very simply zeroized by means of a device acting in the manner of an inverted capstan.

For this purpose, there is provided on the end of the sleeve a pulley or knurled roller on which there are wound one or more convolutions of a cable, one end of which is free while the other end is retained by a spring, the cable being wound on the pulley or roller in such a direction that when a pull is exerted on the free end, the cable is tightened on the roller, which is thereby rotated, while the return movement of the cable under the action of the return spring when the free end of the cable is released takes place without driving the roller and consequently the sleeve and the trip totalizer.

Naturally, the said sleeve is mounted with friction on the shaft, so that it is driven thereby in the normal movement.

The locking and unlocking of each of the drums (except the first) takes place in known manner as shown, for example, in my said Patent No. 1,695,663: each drum is provided with two cheeks, one of which has on its periphery a ten-toothed ratchet, while the other is provided with a cam which, at each revolution, disengages a hooked member or flexible blade engaging in the successive teeth of the ratchet of the following drum, so as to permit the drum to complete one tenth of a revolution when the preceding drum has completed a whole revolution, in accordance with a well known method.

In a particular arrangement, the cheeks of the general totalizer comprise teeth of such form that the locking member prevents rotation of the corresponding drum in one direction or the other until the locking member is released by the cam of the contiguous drum.

In accordance with another feature of the invention, the body of the drum consists of plastic material and studs of pre-determined dimensions are provided in pre-determined positions on the faces to ensure positioning of the cheeks without any possibility of error.

The invention will now be described by way of example with reference to the accompanying drawings, in which:

Fig. 1 is a plan view, partly in section, of a device embodying features of the present invention, showing the manner of assembly of the totalizers;

Fig. 2 is a sectional view of the capstan which is disposed at the right-hand end of Fig. 1;

Fig. 2a is a sectional view similar to Fig. 2, on an enlarged scale, showing the sleeve clutching the shaft upon which it is mounted;

Fig. 2b is similar to Fig. 2a but showing the sleeve in non-clutching position;

Fig. 3 is a perspective view of the sleeve shown at the right-hand side of Fig. 1;

Fig. 4 is a sectional view of a totalizer drum;

Fig. 5 is an elevational view of the drum shown in Fig. 4;

Fig. 6 is a fragmentary view showing a modified construction;

Fig. 7 is a plan view of the ratchet wheel associated with the general totalizer; and Fig. 8 is a similar view of the ratchet wheel associated with the trip totalizer.

Referring to the drawings, notably to Figure 1, it will be seen that the trip and general totalizers are mounted on a common shaft one behind the other.

To this end, the shaft 1 comprises a sleeve 2 on which there are mounted drums 3, 4 and 5 of the trip totalizer. The section of the shaft 1 extending from the sleeve supports the drums 6, 7, 8, 9 and 10 of the general totalizer. The assembly of drums bears against a knurled roller 15 mounted at the end of sleeve 2 under the action of a single spring 11 coiled on one end of the shaft. Friction discs 12 are provided in the usual manner between the drums.

The shaft 1 is driven by a pinion 13 and a worm 14 about the knurled roller 15 (which could be replaced by a pulley having a helical groove), one or more turns of a cable 16 are wound. One end of the cable is maintained in a slotted member 17, in which it is secured to the end of a return spring 18, while the other end of the cable hangs freely (Figure 2).

Each of the drums comprises in the usual manner a cheek on each side face, one of the cheeks, 24a, of one drum comprising a cam, while the other cheek, 24b, comprises a ratchet having ten teeth, the cam of one drum and the ratchet teeth of the following drum cooperating with a locking member such as a curved blade 50 in the usual manner.

Naturally, the input drums 3 and 6 of the totalizer have no ratchet cheek, these drums always being frictionally driven, one by the sleeve and the other directly by the shaft.

The ratchet teeth 24b' of the general totalizer are of a form such as that shown in Figure 7, which prevents rearward rotation of the corresponding drums. The teeth $24b^2$ of the ratchets of the trip totalizer, on the other hand, are of a form such as that shown in Figure 8, which permits reverse rotation of the corresponding drums by the sleeve without any action on the locking member being required.

Referring to Figure 3, which shows a perspective view of the sleeve, it will be seen that the sleeve is split at 20 over its whole length, and forms a roller mounted with clearance on the shaft 1. Moreover, the sleeve has a circumferential slot 2' so as to define a tongue $2^2$ which, when more tightly coiled than the other part of the sleeve, acts as a friction spring. Mounted on said tongue is the reverse driving roller 15. A stud 15a integral with the roller and penetrating into the slot 20 ensures positive driving of the sleeve. Moreover, by reason of the slot, the action of the stud in the rearward driving direction for zeroizing the trip totalizer tends to uncoil the tongue and consequently to reduce the friction.

When the shaft 1 turns in the direction of the arrow $x$ (normal operation) it carries with it the sleeve 2 which is frictionally engaged with it by means of the tongue $2^2$, and the drums of the trip totalizer mounted by friction on the sleeve 2 are, of course, also rotated. When, on the other hand, the free end of the cable 16 passing around the knurled roller 15 is drawn in the direction $y$ (Fig. 2b), the spring 18 is compressed and the cable is tightened upon the roller 15 and rotates the roller in the direction of the arrow $y'$. However, the stud 15a of the roller 15 simultaneously engages the end edge of the tongue $2^2$ which is integrally formed at the end of sleeve 2 and such engagement "unlocks" the sleeve with respect to the shaft 1, i. e. the friction between the sleeve and the shaft is reduced. The stud 15a, upon such engagement with the tongue $2^2$, rotates the unlocked sleeve in the direction of the arrow $y'$, and thus the drums of the trip totalizer, which are frictionally mounted on the sleeve, are also rotated in the same direction. However, by reason of the reduced friction between the sleeve and the shaft 1 upon which the drums of the general totalizer are mounted, neither the shaft 1 nor the general totalizer drums rotate. As a result, only the trip totalizer is zeroized.

When the traction force on the free end of the cable 16 is released, the spring 18 returns to its initial non-compressed position, with the cable 16 loosely engaged with the knurled roller 15 so that neither the roller nor the trip totalizer drums rotate. During the rotation of the trip totalizer drums as described above, the drums will be driven in reverse until their cams encounter the locking member, which prevents any further movement in this direction, the device thus acting in the manner of a capstan.

Each drum consists of a moulded plastic element 23, on the faces of which the cheeks 24 are mounted. In order that the cheeks may be readily and accurately positioned, the moulded element (Figure 4) has on one face a stud 23a corresponding to an orifice provided, for example, in the cheek 24a formed with a cam, and on the other face two studs 23b corresponding to two orifices formed in the cheek 24b comprising a ratchet. The studs 23a and 23b are of different diameters, the diameter of the stud 23a being larger than those of the studs 23b.

Figure 6 shows a modification of the zeroizing device.

In this modification, the shaft 1 has on its end a pinion 25, with which there is adapted to engage a sector 26 pivotally mounted at 27 and actuated by means of a cable 28. A pull on the cable 28 rotates the sector and consequently the pinion and the shaft.

An instrument is thus provided, in which the trip totalizer may be zeroized without any disengaging device and which requires only a single control for the two totalizers, which are mounted on a single shaft or on shafts having a sliding coupling.

I claim:

1. An odometer for vehicles and the like, comprising a trip totalizer and a general totalizer, each totalizer comprising a plurality of drums, a first member for supporting the drums of said trip totalizer, a second member for supporting the drums of said general totalizer, and one-way friction means for connecting said two members together whereby said connecting means is effective in one direction of rotation only.

2. An odometer as defined in claim 1, wherein said members for supporting said drums comprise two shafts connected together by a friction coupling and wherein said two shafts are mounted in alignment with one another.

3. An odometer as defined in claim 1, wherein said members for supporting said drums comprise two shafts connected together by a friction coupling, and further comprising a pinion secured at the outer end of the shaft carrying the drums of the trip totalizer, a fixed axle rotatably carrying a toothed segment meshing with said pinion, a cable secured to said segment to effect rotation thereof, and concurrent rotation of said shaft and the drums carried by it for zeroizing said trip totalizer.

4. An odometer according to claim 1, wherein said first member for supporting said drums of the trip totalizer is a sleeve, and said second member for supporting said drums of the general totalizer is a shaft, said shaft having a portion extending inside said sleeve and carrying said sleeve, the drums of the general totalizer being mounted directly on the shaft beyond the sleeve, and spring means for urging the drums of both totalizers against an abutment on the end of said shaft.

5. An odometer according to claim 4, a knurled wheel fixed at the end of said sleeve carrying the drums of the trip totalizer, at least one convolution of a cable being wound on said knurled wheel, one end of said cable being maintained by a spring while the other end is free and the direction of winding being such that when a force is exerted on the free end the cable tends to be tightened on the knurled wheel and to drive it and the sleeve carrying the drums of the trip totalizer in the direction opposite to the normal direction of operation of the odometer, thus permitting the zeroizing of the trip totalizer.

6. In an odometer according to claim 5, said sleeve being longitudinally split along its entire length and is further slotted to define a tongue which forms a spring which is coiled on the shaft and on which said knurled wheel is mounted, said spring providing said one-way friction means.

References Cited in the file of this patent

UNITED STATES PATENTS

| | | |
|---|---|---|
| 613,766 | Hodgkinson | Nov. 8, 1898 |
| 780,251 | Wright | Jan. 17, 1905 |
| 790,075 | Pfaff | May 16, 1905 |
| 1,055,905 | Hansen | Mar. 11, 1913 |
| 1,319,205 | Carlson | Oct. 21, 1919 |
| 1,408,598 | Jones | Mar. 7, 1922 |
| 1,456,513 | Olsen | May 29, 1923 |
| 1,551,957 | Huntley | Sept. 1, 1925 |
| 1,660,641 | Banning | Feb. 28, 1928 |
| 1,695,663 | Rodanet | Dec. 18, 1928 |
| 1,738,558 | Berge | Dec. 10, 1929 |
| 2,159,915 | Van Wagenen | May 23, 1939 |
| 2,188,748 | Carlstrom | Jan. 30, 1940 |
| 2,198,063 | Seignol et al. | Apr. 23, 1940 |
| 2,596,044 | Rodanet | May 6, 1952 |

OTHER REFERENCES

Du Pont's Plastics Bulletin, page 191, vol. 12, 1950, No. 48, published by E. I. du Pont De Nemours and Co., Inc., at Wilmington, Delaware, 1950.

"Mechanical Movements," page 39, Fig. 113, by Hiscox, published by N. W. Henley and Co., 132 Nassau St., New York, 1901.